US006184270B1

(12) United States Patent
Beckman et al.

(10) Patent No.: US 6,184,270 B1
(45) Date of Patent: Feb. 6, 2001

(54) PRODUCTION OF POWER FORMULATIONS

(76) Inventors: Eric J. Beckman, 417 Willow Place, Pittsburgh, PA (US) 15218; Mark O'Niell, 830 N. 30$^{th}$ St., Allentown, PA (US) 18104

( * ) Notice: Under 35 U.S.C. 154(b), the term of this patent shall be extended for 0 days.

(21) Appl. No.: 09/157,918

(22) Filed: Sep. 21, 1998

(51) Int. Cl.$^7$ ........................................................ C08J 3/12
(52) U.S. Cl. ................................................................ 523/309
(58) Field of Search ............................................... 523/309

(56) References Cited

U.S. PATENT DOCUMENTS

| | | | |
|---|---|---|---|
| 2,347,464 | 4/1944 | Cuno | 260/758 |
| 3,914,354 | * 10/1975 | Ueki | 264/13 |
| 3,981,957 | 9/1976 | Van Brederode et al. | 260/878 R |
| 4,012,461 | 3/1977 | Van Brederode et al. | 260/878 R |
| 4,582,731 | 4/1986 | Smith | 427/421 |
| 4,734,227 | 3/1988 | Smith | 264/13 |
| 4,734,451 | 3/1988 | Smith | 524/493 |
| 4,933,404 | 6/1990 | Beckman et al. | 526/207 |
| 5,126,058 | 6/1992 | Beckman | 210/774 |
| 5,211,342 | 5/1993 | Hoy et al. | 239/707 |
| 5,290,827 | 3/1994 | Shine | 523/340 |
| 5,387,619 | 2/1995 | Lee et al. | 521/133 |
| 5,399,597 | 3/1995 | Mandel et al. | 523/342 |
| 5,407,267 | 4/1995 | Davis et al. | 366/152 |
| 5,478,910 | 12/1995 | Russell et al. | 528/274 |
| 5,514,512 | 5/1996 | Cunningham et al. | 430/137 |
| 5,514,513 | 5/1996 | Cunningham et al. | 430/137 |
| 5,514,514 | 5/1996 | Cunningham et al. | 430/137 |
| 5,548,004 | 8/1996 | Mandel et al. | 523/342 |
| 5,639,441 | 6/1997 | Sievers et al. | 424/9.3 |
| 5,641,887 | 6/1997 | Beckman et al. | 546/26.2 |
| 5,698,163 | 12/1997 | Mandel et al. | 422/105 |
| 5,708,039 | 1/1998 | Daly et al. | 521/61 |
| 5,716,558 | 2/1998 | Nielson et al. | 264/13 |
| 5,766,522 | 6/1998 | Daly et al. | 264/13 |
| 5,766,637 | 6/1998 | Shine et al. | 424/497 |
| 5,981,696 | 11/1999 | Saatweber et al. | 528/501 |

FOREIGN PATENT DOCUMENTS

| | | |
|---|---|---|
| 2233138 | 1/1974 | (DE) . |
| 4028567 | 3/1992 | (DE) . |
| 0 661 091 | 9/1994 | (EP) . |
| 0 720 999 | 7/1996 | (EP) . |
| 0 720 992 | 10/1996 | (EP) . |
| 8-113652 | 5/1996 | (JP) . |
| WO 92/00342 | 1/1992 | (WO) . |
| WO 94/09913 | 5/1994 | (WO) . |
| WO 99/24493 | 5/1999 | (WO) . |

OTHER PUBLICATIONS

Ullmans Encyclopedia of Technical Chemistry, vol. 15, No. 4 revised & expanded edition entitled "Corrosion to Varnishes" (1998).

Textbook of Varnishes and Coatings, vol. IV, entitled Varnish and Coating Systems, Formulations (1976), p. 355.

Ind Eng Chem Res, vol. 26, No. 11, entitled "Rapid Expansion of Supercritical Fluid Solutions: Solute Formation of Powders, Thin Films, and Fibers", by Matson et al., pp. 2298–2306.

1995 American Chemical Society, "Formulation of Poly (1,1,2,2–tetrahydroperfluorodecyl acrylate) Submicron Fibers and Particles from Supercritical Carbon Dioxide Solutions".

JP 53005239 abstract—STN International search (Jan. 1994).

W. Cobbs et al., "High Solids Coatings above 80% by Volume", presented at Water–Borne and Higher Solids Coatings Symposium on Mar. 10–12, 1980 in New Orleans, LA, USA.

Powder Coating, Mar. 1996, "VAMP puts Pressure on Traditional Powder Coatings Production Process", pp. 58–63.

* cited by examiner

*Primary Examiner*—Paul R. Michl
(74) *Attorney, Agent, or Firm*—Bartony & Hare

(57) ABSTRACT

A method for producing a powder comprises the steps of: charging a vessel with a mixture of at least two solid components. At least one of the solid components comprises a polymeric resin. The vessel with charged with a fluid in which the polymeric resin, and preferably the other components of the mixture, are not substantially soluble. The fluid is selected such that the density of the fluid can be adjusted upon adjustment of temperature and pressure in the vessel to enable creation of a suspension of the mixture within the vessel upon agitation of the contents of the vessel. The temperature is maintained above the glass transition temperature of the polymeric resin in the fluid. The pressure of the fluid is adjusted such that the density of the fluid enables creation of the suspension of the mixture within the vessel upon agitation of the contents of the vessel. The contents of the vessel is agitated to create the suspension. The temperature is then reduced to a temperature below the glass transition temperature of the polymeric resin component in the fluid.

36 Claims, 5 Drawing Sheets

PRODUCTION OF POWER FORMULATIONS

FIELD OF THE INVENTION

The present invention relates to a process for producing powder, and more particularly, to a process for producing powder formulations by creating a suspension in a compressible fluid.

BACKGROUND OF THE INVENTION

Powder coatings are promoted as environmentally benign coating systems in that no solvent is used during the application of the coating to the substrate. Powder coating formulations are quite expensive, however, primarily as a result of the extensive processing required to generate the powder. During such processing, resin, which is typically either an acrylate or polyester, is blended with a variety of additives (for example, pigments, stabilizers, fillers) and then extruded to generate an intimate mixture. The efflux from the extruder is pelletized, then ground, then sieved to recover only the smaller particles. The extensive processing of powder coatings and the relatively low yield (as a result of the sieving step) results in a per-pound cost typically in excess of $5. The expensive nature of powder coating has been a substantial factor in preventing powder coatings from capturing more of the overall coatings market.

Attempts to improve the processing of powder coatings have met with limited success. For example, U.S. Pat. Nos. 5,399,597 and 5,548,004 disclose a process purported to generate powder coating formulations via processing with supercritical carbon dioxide ($CO_2$). In general, the process comprises the steps of (a) adding all of the mix components to a pressure vessel, (b) adding $CO_2$ at a supercritical pressure and temperature, (c) stirring the components within the pressure vessel; and (c) subsequently blowing the contents through a nozzle into a second vessel maintained at a lower pressure, thereby exploding the mixture into droplets.

There are a number of potential problems with the process of U.S. Pat. Nos. 5,399,597 and 5,548,004. For example, explosion of the contents of the pressure vessel in that process may result in an undesirably broad distribution of particle sized in the resulting powder coating. Moreover, control of the process via control of the aperture size of the nozzle is likely to be difficult. Furthermore, very high pressures are required.

European Patent Application No. 95308726.9 discloses a process in which supercritical $CO_2$ and typically a cosolvent are purportedly used to dissolve some components of a coating powder. The mixture is then flashed through a valve, causing rapid precipitation of a powder. A substantial problem exists with the process of European Patent Application No. 95308726.9 in that some of the starting components are partially soluble in $CO_2$ (in the case of resin, for example, only a part of the molecular weight distribution), while others are completely insoluble in $CO_2$ (for example, the pigments and other inorganic components). It is thus likely that fractionization of the resin will occur under the described process conditions when using only $CO_2$ as a solvent. Moreover, the use of cosolvents such as tetrahydrofuran (THF) to reduce fractionization through creation of a single phase can render the process environmentally unfriendly as a result of residual solvent in the powder coating. Residual solvent can also make particles stick together. Furthermore, dissolving the starting materials in a single phase is also likely results in submicron sized particles which are undesirably small for use in powder coatings.

Given the limitations of current processes for the generation of powder formulations, it is very desirable to develop improved processes for the generation of powder formulations.

SUMMARY OF THE INVENTION

The present invention provides generally a method for producing a powder formulation comprising the steps of:
 a. charging a vessel with a mixture of at least two solid components, at least one of the solid components comprising a polymeric resin;
 b. charging the vessel with a fluid in which the polymeric resin and, preferably, all other components of the mixture are not substantially soluble, the fluid selected such that the density of the fluid can be adjusted upon adjustment of temperature and pressure in the vessel to enable creation of a suspension of the mixture within the vessel upon agitation of the contents of the vessel;
 c. maintaining or adjusting the mixture to a temperature above the glass transition temperature of the polymeric resin in the fluid;
 d. adjusting the pressure of the fluid such that the density of the fluid enables creation of the suspension of the mixture within the vessel upon agitation of the contents of the vessel;
 e. agitating the contents of the vessel; and
 f. reducing the temperature to a temperature below the glass transition temperature of the polymeric resin component in the fluid.

The present invention also provides generally a method for producing a powder formulation comprising the steps of:
 a. charging a vessel with a mixture of at least two solid components, at least one of the solid components comprising a polymeric resin;
 b. charging the vessel with a fluid in which the polymeric resin and, preferably, all other components of the mixture are not substantially soluble, the fluid selected such that the density of the fluid can be adjusted upon adjustment of temperature and pressure in the vessel to be within approximately 50% of the average density of the mixture of components;
 c. maintaining or adjusting the temperature of the mixture to a temperature above the glass transition temperature of the polymeric resin in the fluid;
 d. adjusting the pressure of the fluid such that the density of the fluid is within approximately 50% of the average density of the mixture of components;
 e. agitating the contents of the vessel; and
 f. reducing the temperature to a temperature below the glass transition temperature of the polymeric resin component in the fluid.

In the methods of the present invention, upon removal of the fluid (for example, via a pressure quench) a powder product remains. Preferably, the temperature and pressure are decreased simultaneously in step f, for example, via flashing the contents of the vessel through a valve.

In general, the pressure in the vessel is preferably increased to within approximately 50% of the average density of the mixture of components and the mixture of components mixed sufficiently vigorously to create a generally uniform suspension of the components in the fluid. As used herein, the phrase "within approximately 50% of the average density of the mixture of component" means that the density of the fluid does not deviate from the average density of the mixture of components by more than approximately 50%. For example, if the average density of the mixture of components is 1 g/cc, the density of the fluid should be adjusted to a density in the range of approximately 0.5 g/cc to approximately 1.5 g/cc.

As clear to one skilled in the art, the more closely the density of the fluid is matched to the average density of the mixture of components, the easier it is to achieve a suspension of the mixture of components. Therefore, the density of the fluid is more preferably adjusted to within approximately 30% of the average density of the mixture. Even more preferably, the density of the fluid is adjusted to within approximately 15% of the average density of the mixture. Most preferably, the density of the fluid is adjusted to within approximately 5% of the average density of the mixture.

As used herein, the "average density of the mixture" is calculated using the following formula:

$$\rho_{avg} = \Sigma w_1\rho_1 + w_2\rho_2 + w_3\rho_3$$

wherein $\rho_{avg}$ is the average density (g/cc) of the mixture; $w_1$, $w_2$, and $w_3$ are the weight percents of components 1, 2, and 3, respectively, divided by 100; and $\rho_1$, $\rho_2$, and $\rho_3$ are the densities of components 1, 2 and 3, respectively. For example, in a two component mixture comprising 95 wt % of a resin having a density of 1.4 g/cc and 5 wt % of a curing agent having a density of 2.4 g/cc the average density of the mixture would be calculated as follows:

$$\rho_{avg} = 0.95(1.4 \text{ g/cc}) + 0.05(2.4 \text{ g/cc}) = 1.45 \text{ g/cc}$$

For many powder coating formulations, the average density of the mixture will be approximately equal to the density of the polymeric resin because the mixture comprises predominantly the polymeric resin.

As used herein, the term "suspension" refers generally to a system in which small particles of a liquid (swelled polymeric resin in the present invention) are distributed (and preferably, generally uniformly distributed) in a fluid medium (the process fluid in the present invention). A surfactant (surface-active agent) or wetting agent can be used in the mixture of components of the present invention to assist in creating a suspension if density matching and mixing alone are insufficient to create a suspension. The term "dispersion" is generally used to describe a two phase system created with use of a surfactant where one phase, comprising finely divided particles, is suspended or distributed throughout a bulk or continuous phase (the process fluid phase in the present invention). A surfactant or wetting agent may help to create a uniform distribution or suspension or the dispersion phase within the continuous phase by reducing interfacial tension between the two phases. As used herein, the term "suspension" includes a dispersion.

If a suspension can be created without the use of a surfactant in the present invention, it is preferable that a surfactant not be used. In that regard, surfactants are typically very expensive. Moreover, surfactants may be difficult to remove from the powder coating product and may prevent aggregation of droplets during formation of the coating.

The average particle size of the powder product of the present invention can be adjusted, for example, by controlling the speed or vigorousness of agitation. For example, more vigorous agitation should result in a finer suspension or dispersion, the reby resulting in a finer powder. Other variables affecting average particles size include temperature, pressure and/or the presence or absence of a surfactant.

DETAILED DESCRIPTION OF THE INVENTION

The present inventors have discovered that one can generate a powder from a polymeric resin and other starting materials by creating a suspension of the starting materials in a fluid (preferably, a supercritical or near-critical fluid) and subsequently decreasing the temperature and pressure to form a powder.

The density of the process fluid is preferably suitably adjustable to achieve a suspension of the mixture of components within the fluid. The closer the density of the fluid can be matched to the average density of the mixture of components ($\rho_{avg}$), the easier it is to achieve such a suspension of the polymeric resin and other components in the fluid. For example, less vigorous mixing is required when the fluid density is closely matched to $\rho_{avg}$.

The fluid is also preferably suitable to swell the polymer resin. Nonetheless, it is undesirable to dissolve the polymeric resin in the fluid as overly small particles may result. The fluid is thus preferably chosen such that the polymeric resin and other starting components and the other starting components are substantially insoluble therein. Preferably, the solubility of the polymeric resin in the fluid is no more than approximately 2 wt %. More preferably, the solubility of the polymeric resin in the fluid is no more than approximately 0.1 wt %.

Figure 1:
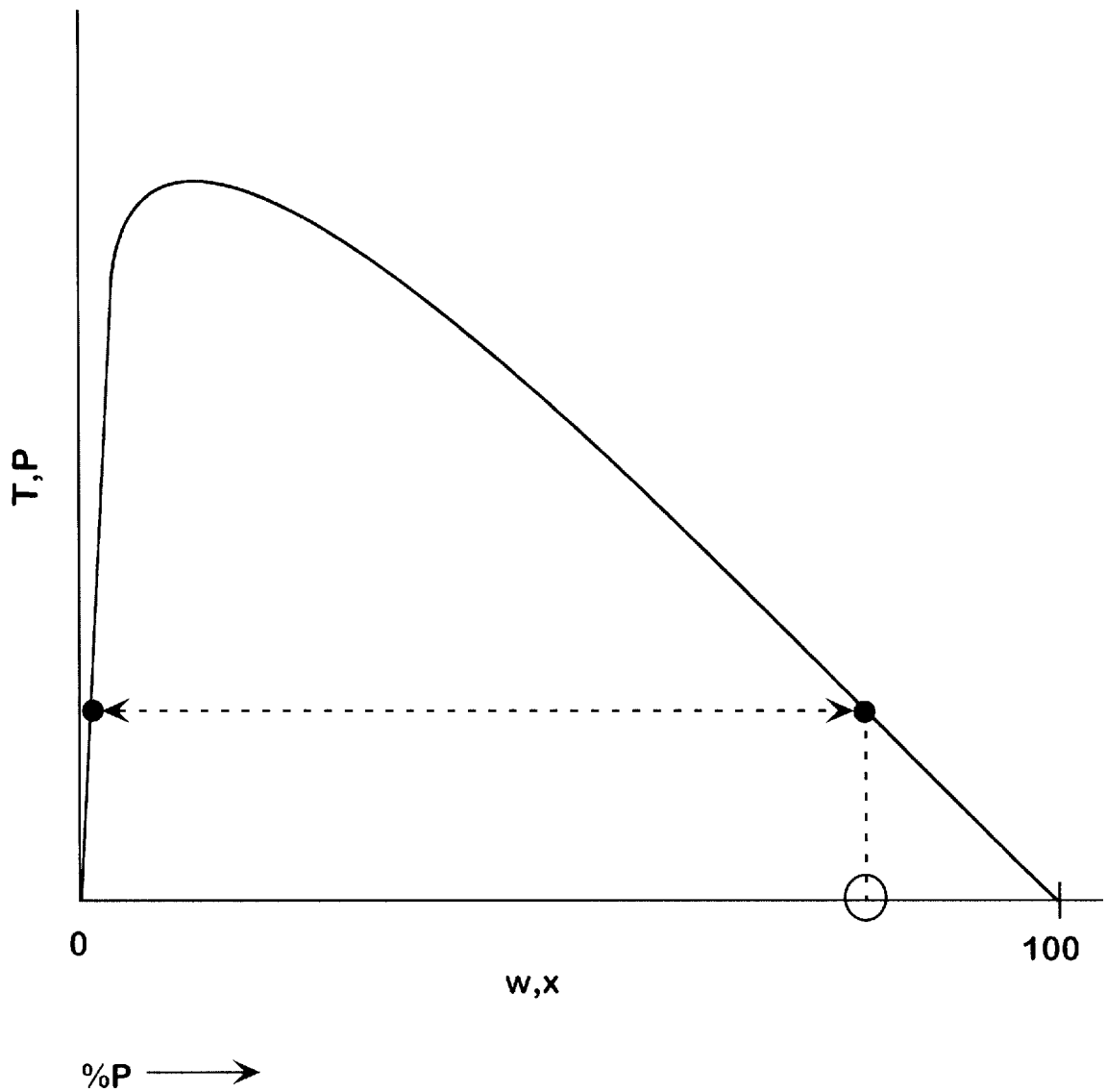
FIG. 1 illustrates a liquid-liquid miscibility gap in P-x or T-x space.

For example, FIG. 1 illustrates a liquid-liquid miscibility gap in either pressure (P-x) space or temperature (T-x) space. The shape of the liquid-liquid miscibility gap is a result of the difference in sizes between the solute and the solvent (that is, between the polymeric resin and the fluid, respectively). The space under the curve is the two-phase region, while the space above the curve is the single-phase region. The horizontal dashed line is a tie-line showing coexisting liquid phases. In the method of the present invention, it is desirable to swell the polymer such that the glass transition temperature drops precipitously, resulting in a liquid, rather than glassy, polymeric resin under relatively mild process conditions. The swelling curve is the right side of the liquid-liquid curve. Once in a liquid state, provided that the viscosity of is sufficiently suppressed, agitation will then generate a suspension of polymer-fluid droplets (and other components) in the essentially pure fluid continuous phase. Thus, there will be two phases in the vessel. The first phase is a swollen polymer phase (the point on the liquid-liquid curve to the right). The second phase is an essentially pure fluid phase (the point on the liquid-liquid curve to the left).

Process fluids for use in the present invention preferably also have boiling points below room temperature (that is, approximately 25° C.). More preferably, the process fluids have boiling points less than approximately 0° C. Such process fluids are easily removed and recycled following creation of the particles.

As set forth above, the density of the process fluid is preferably suitably adjustable to achieve a suspension of the mixture of components within the fluid. One way to achieve substantially broad adjustability of the density of a fluid is to operate in the vicinity of the critical temperature of the fluid. In the vicinity of the critical temperature, relatively large changes in fluid density can be made with relative small changes in pressure. As typical with most processes, it is desirable to operate the process of the present invention at relatively mild conditions (that is, relative low temperature and pressure). For example, reductions in operating temperature reduce operating costs. Furthermore, some of the polymers resins used in the process of the present invention are thermally unstable at high temperatures. In that regard, the critical temperature of the process fluids of the present invention is preferably less than approximately 100° C. More preferably, the critical temperature of the process fluids of the present invention is less than approximately 80° C.

The process fluids of the present invention are further preferably relatively environmentally benign. The present inventors have discovered that all of the above general criteria are satisfied by compounds such as those listed in Table 1. The critical temperature ($T_c$) of each compound is also set forth.

TABLE 1

| Compound | $T_c$ (° C.) |
|---|---|
| $SF_6$ | 47 |
| $CF_3H$ | 26 |
| $C_2F_6$ | 32 |
| $C_2F_5H$ | 66 |
| $C_2F_4H_2$ | 97 |
| Xenon | 16 |

The list of compounds set forth in Table 1 is illustrative only. Other compounds and mixtures of compounds satisfying the general criteria set forth above are suitable for use in the present invention.

For example, although certain fluorinated compounds are very dense, in some cases they may be extremely poor solvents for the polymeric resin and be unable to swell and/or plasticize the polymer resin to any appreciable amount. In other cases, one may wish to lower the critical temperature of a fluid to reduce the required process temperature. In the above cases, mixtures of such compounds with other compounds may be desirable. In that regard, a mixture of $SF_6$ and $CO_2$ is suitable for use in the present invention. $CO_2$ lowers the critical temperature of the fluid and improves the swelling and plasticizing properties of the fluid. However, $CO_2$ alone is not suitable for use in the present invention because one cannot sufficiently match the density of $CO_2$ with the average density of the mixture of starting components. Similarly, mixtures of $C_2F_6$ and $CO_2$ are also suitable. Generally, the critical temperature will change/scale proportionally to the mole fractions of the fluids in the mixture. Table 2 sets forth several example of mixtures of fluids suitable for use in the present invention. The list of mixtures set forth in Table 2 is illustrative only. Other mixtures, including ternary and higher mixtures of compounds, are also suitable in accordance with the general criteria set forth above.

TABLE 2

| Mixture | Effect of Second Compound |
|---|---|
| $SF_6 + CO_2$ | Lower $T_c$ and enhances plasticizing |
| $SF_6 + CF_3H$ | Lower $T_c$ and enhances plasticizing |
| $SF_6 + CF_4$ | Lower $T_c$ with little reduction in density |
| $SF_6 + C_2F_6$ | Lower $T_c$ with little reduction in density |
| $SF_6 + C_2F_5H$ | Raises $T_c$, but enhances plasticizing |
| $SF_6 + C_2F_4H_2$ | Raises $T_c$, but enhances plasticizing |
| $C_2F_5H + CO_2$ | Lowers $T_c$ |
| $C_2F_5H + C_2F6$ | Lowers $T_c$ |
| $C_2F_5H + CF_4$ | Lowers $T_c$ |
| $C_2F_5H + CF_3H$ | Lowers $T_c$ |
| $C_2F_4H_2 + CO_2$ | Lowers $T_c$ |
| $C_2F_4H_2 + C_2F_6$ | Lowers $T_c$ |
| $C_2F_4H_2 + CF_4$ | Lowers $T_c$ |
| $C_2F_4H_2 + CF_3H$ | Lowers $T_c$ |

In addition to operating the process of the present invention in the vicinity of the critical temperature of the process fluid, certain compressed liquids may be used to achieve a suspension of the mixture of components within the compressed liquid. For example, although perfluorobutane has a critical temperature above 100° C., perfluorobutane may be used in the form of a compressed liquid in the present invention at temperatures below 100° C. Use of compressed liquids in the process of the present invention may offer a number of advantages over the use of process fluids in the vicinity of their critical temperatures. For example, compressed liquids may be easier to recycle and require lower operating pressures.

Particular fluorinated liquids/fluids, including $SF_6$ and perfluorobutane, are preferred for use in the present invention. Using these fluids, one can, for example, easily match the density of most polymer resins (approximately 1.0 to 1.4 g/cc) without requiring extremely high pressures.

Although the densities of other compounds, including certain chlorinated and brominated compounds, can be adjusted via adjustment of temperature and pressure for use in the present invention, many such compounds are generally environmentally unfriendly. With respect to environmental concerns, fluorinated liquids/fluids may provide particular advantages. For example, $SF_6$ and perfluorobutane have toxicity ratings of "2" (the same as the toxicity rating for argon). Although each of $SF_6$ and perfluorobutane is a greenhouse gas, each has an ozone depletion number (ODN) of zero. Because of great activity in new fluorocarbon solvent development as result of the Montreal Protocols and the subsequent elimination of chlorofluorocarbons (CFC's), there are a substantial number of fluorocarbons suitable for use in the present invention commercially available.

Examples of starting materials suitable for use in the present invention include thermoplastic base resins such as, for example, PVC homopolymer resins, polyamide resins, polyethylene resins, polypropylene resins, cellulose esters, polyester resins, ethylenechlorotrifluoroethylene resins, poly(vinylidene fluoride) resins, poly(phenylene sulfide) resins, and thermoset resins, such as, for example, epoxy resins, polyurethane resins, hydroxy and carboxy functional thermoset polyester resins and acrylic resins. Curing agents such as, for example, dicyanamide type, phenolic formaldehyde, polyamine type, TGIC, beta hydroxy alkyl amide types, tetramethoxymethyl glycoluril and glycidyl functional acrylic resins may also be employed when thermoset base resins are utilized. Flow control agents such as, for example, polyacrylates, silicones, waxes and cellulose acetate butyrate may also be employed. When utilizing thermoplastic resins, plasticizers such as, for example, styrene maleic anhydride and -di-butyl thalate may be utilized. Stabilizers such as, for example, tetrakis(methylene(3,5-di-tert-butyl-hydroxyhydrocinnamate)) zinc compounds, tin compounds and polyols may also be utilized. Extenders or extender pigments such as, for example, barium sulfate and calcium carbonate may also be utilized. Both organic and inorganic pigments may be included to impart color, opacity and other visual qualities to the coating produced with the coating powder formulations.

Figure 2A:
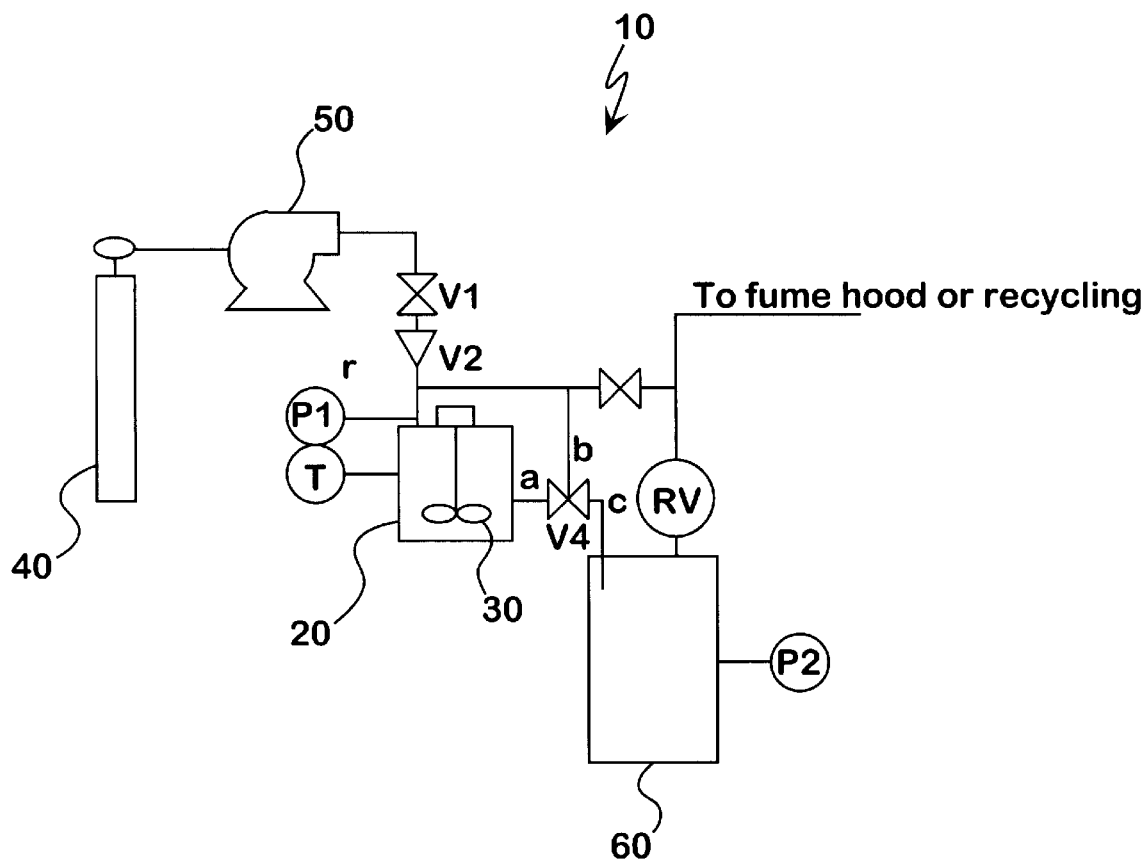
FIG. 2A illustrates schematically an embodiment of a system for performing the method of the present invention.

A simplified illustration of one embodiment of a system 10 for use in the present invention is illustrated in FIG. 2A. System 10 comprises a high-pressure vessel 20, which preferably includes an agitating device to agitate the contents thereof such as a mechanical stirrer 30. High-pressure vessel 20 is preferably further equipped with a temperature indicator T and a pressure indicator P1. System 10 further comprises a container 40 for supplying process fluid. Preferably, container 40 is in fluid connection with a compressor or liquid pump 50 which is in turn in fluid connection with high-pressure vessel 20 via high pressure valve V1 and check valve V2.

High-pressure vessel 20 may be in fluid connection with a collector vessel 60 via a high-pressure exit valve V4, which is preferably a three-way ball valve connecting tubes a, b and c. Collector vessel 60 is preferably equipped with a pressure indicator P2.

Figure 2B:
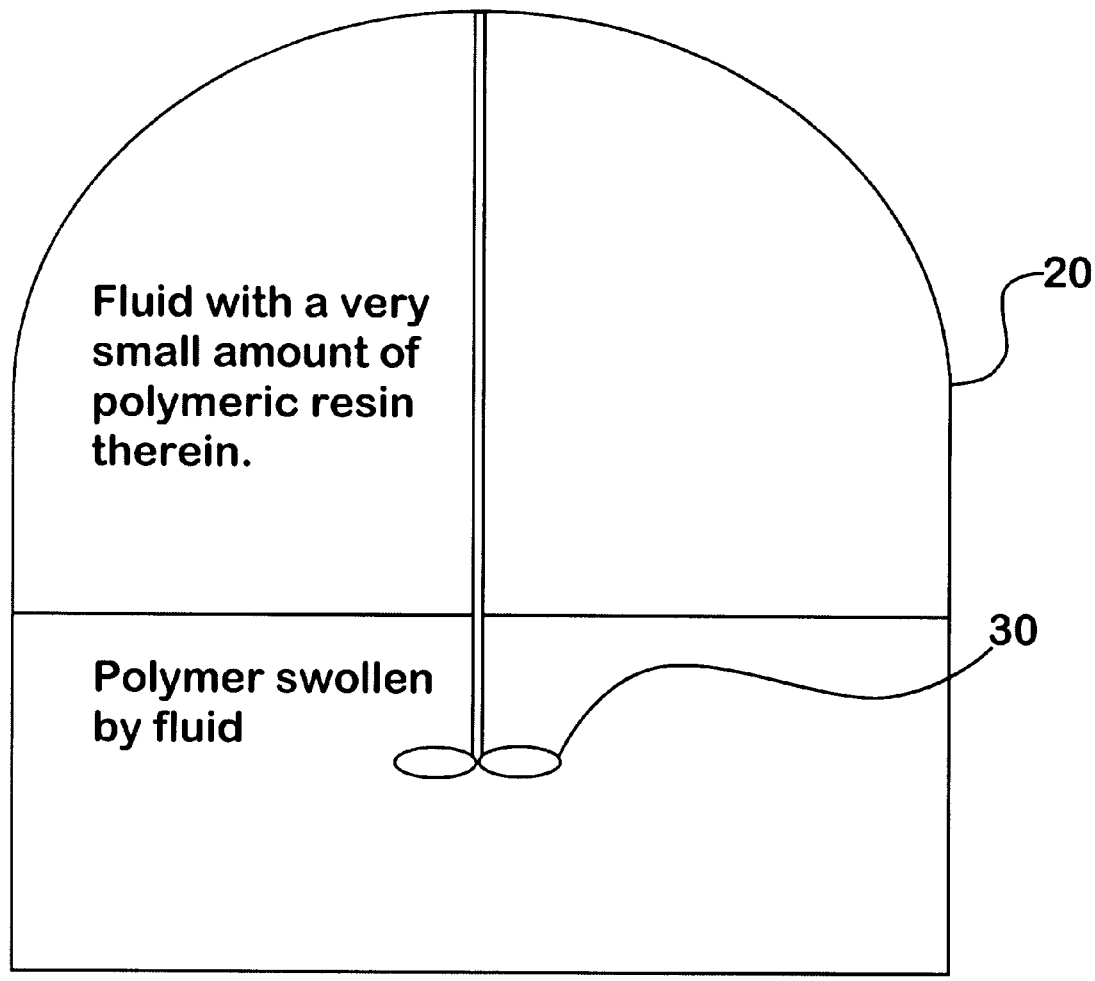
FIG. 2B illustrates the formation of two liquid phases, a swelled polymer phase and a process fluid phase, in the present invention.

During operation, the mixture of components is first charged to high-pressure vessel 20. High-pressure vessel 20 is preferably then adjusted to operating temperature or near operating temperature and process fluid is charged to high-pressure vessel 20 from container 40 to operating pressure. At operating temperature and pressure, the density of the process fluid preferably approximately matches the average density of the mixture of components. The process fluid swells the polymeric resin, lowering the glass transition temperature ($T_g$) of the polymeric resin, and leading to the formation of a liquid phase under the operating conditions. Thus, a liquid-liquid two phase system is preferably formed as illustrated in FIG. 2B. The first liquid phase comprises the process fluid with a very small amount of polymeric resin therein. This first phase will be referred to as the process fluid phase. The second liquid phase comprises the polymeric resin swollen by the fluid.

Figure 2C:
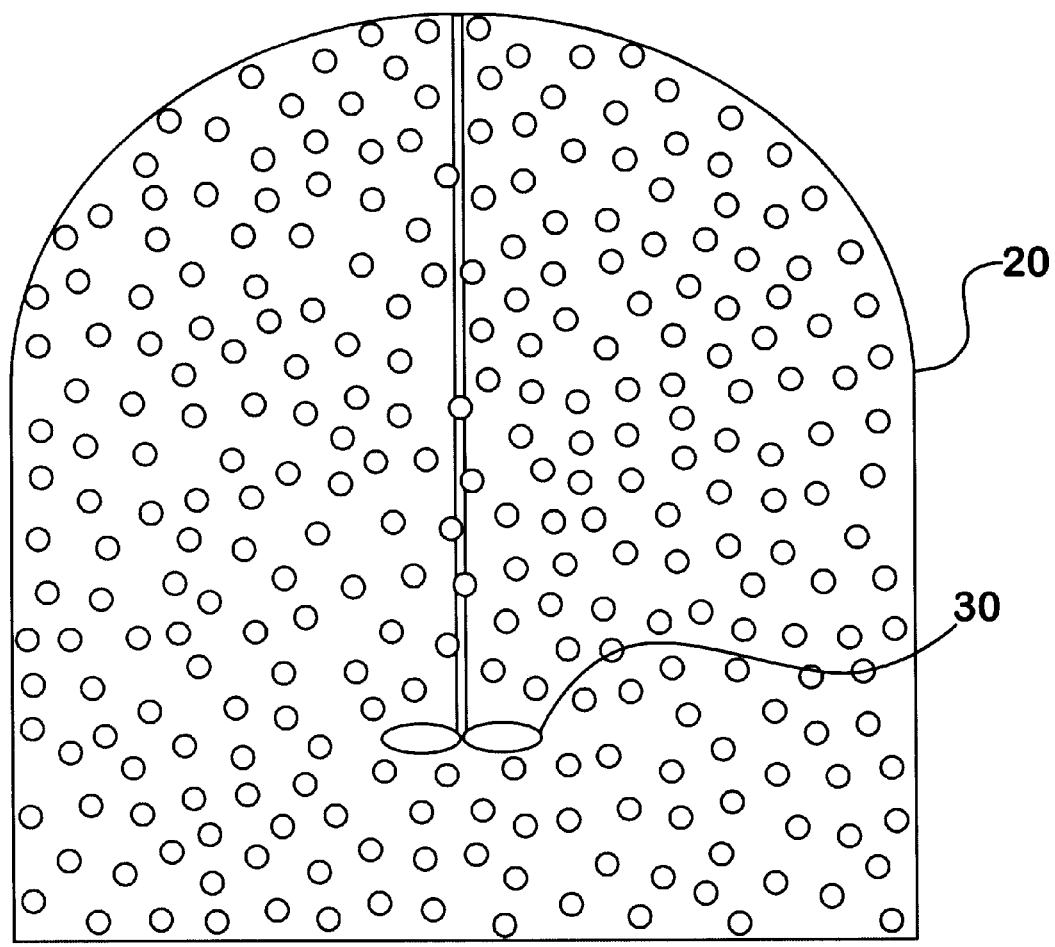
FIG. 2C illustrates formation of a suspension of swelled polymer and other components in the process fluid of the present invention.

The contents of high-pressure vessel 20 are preferably first agitated/stirred slowly with mechanical stirrer 30 to "wet" the other components with the polymeric resin. The contents of high-pressure vessel 20 are preferably then agitated vigorously via mechanical stirrer 30. Preferably, the mixture of starting components is stirred vigorously to create a suspension of a swelled polymer/other starting components/process fluid phase in the process fluid phase as illustrated in FIG. 2C. A surfactant may be added to assist in creating such a suspension as describe above. Preferably, a generally uniformly distributed suspension of the swelled polymer/other starting components/process fluid phase in the process fluid phase is created.

Subsequently, the temperature is preferably decreased below the glass transition temperature of the polymeric resin in the process fluid (to, for example, room temperature). This reduction of temperature may occur in high-pressure vessel 40 and process fluid removed to recover the powder product directly from high-pressure vessel 40. Alternatively, the contents of high-pressure vessel 40 may be flushed via valve V4 into collector vessel 60, which is preferably maintained at room temperature and approximately 300 psi (via back pressure regulator RV), using additional fluid from the container 40 via compressor 50. The powder product can then be removed from collector vessel 60.

After formation of the suspension, the suspension may also be blown through a valve (not shown) into a second vessel (not shown) maintained at a lower pressure than the first vessel. Process fluid can then be removed (for example, "boiled off") from the second vessel, resulting in particles (that is, a powder product). Unlike prior processes, however, there is no need to "explode" the contents of high-pressure vessel 20 through a valve to create a desired powder product.

In that regard, droplets are formed generally via (a) lowering the interfacial tension between the fluid and resin via the swelling of the resin by the fluid; (b) approximately matching the average density of the fluid and the suspended/dispersed phase; and (c) vigorous stirring in the present invention. Fluids with relatively low critical temperatures that are relatively good swelling agents for the polymeric resin are thus preferred, because the operating temperature can be held close to or below the glass transition temperature of the pure polymeric resin.

Unlike prior methods such as disclosed in U.S. Pat. Nos. 5,399,597 and 5,548,004, in which a powder is formed when a mixture of components in a relatively low-density supercritical fluid is exploded through a valve to create particles, the particles of the powder product of the present invention are first formed as suspended droplets within the "density-matched" process fluid of the present invention. Particle size is locked after the temperature drops below the glass transition temperature of the polymeric resin in the fluid. Particle size is preferably locked in via a flashing step in which the temperature and pressure are reduced simultaneously.

EXPERIMENTAL

Procedure 1

Figure 3:
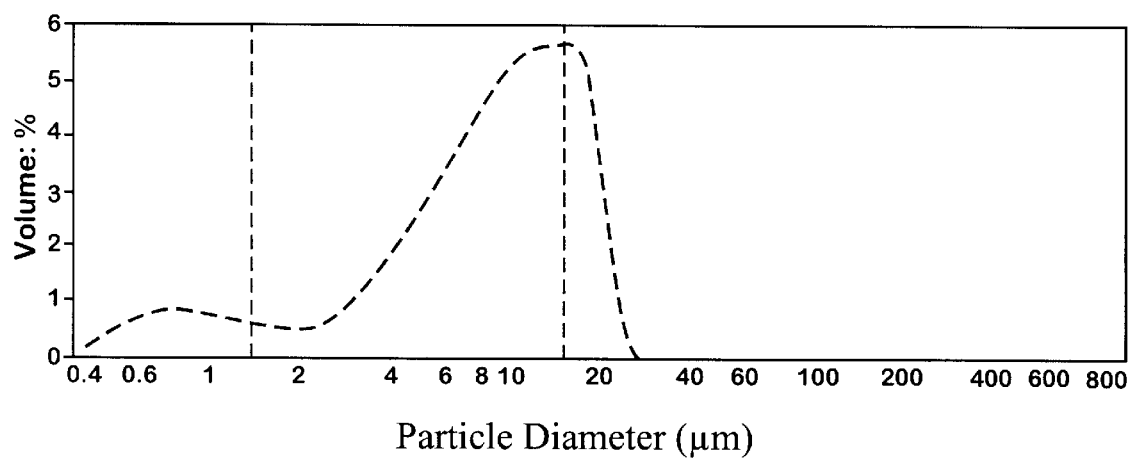
FIG. 3 illustrates a particle size distribution of a powder product produced under the method of the present invention.

To demonstrate the present invention, a typical powder coating resin comprising a glycidal-modified acrylate, having a molecular weight of about 5000 and a glass transition temperature of approximately 42° C., was obtained from PPG Industries Inc. of Pittsburgh, Pa. as ½ inch by ¹⁄₁₆ inch flakes (PCC10103). Approximately 5 grams of the coating resin was added to a 50 cc high-pressure vessel/reactor. The pressure vessel was pre-heated to approximately 80° C., then charged with $SF_6$ to a pressure of approximately 1650 psi. At this pressure, the density of the fluid is predicted to match the density of the resin. The suspension was stirred at 600 rpm for approximately 20 minutes, after which the temperature was lowered to 25° C. Finally, the pressure was reduced rapidly to the vapor pressure. The $SF_6$ was boiled off over a period of approximately 5 minutes. Upon opening the reactor, a fine powder was recovered. The experiment was repeated several times with the same results. FIG. 3 illustrate the particle size distribution of the resultant powder formulation.

Procedure 2

Two formulations were employed under this procedure. One formulation comprised an epoxy-modified acrylic polymer (60%) and 40% titanium dioxide pigment. There was also crosslinker (dodecly dicarboxylic acid) and flow-modifying additives present in the formulation. A second, unpigmented formulation comprised the epoxy-modified acrylic resin plus the crosslinker and the flow additives.

Each formulation was charged to the high-pressure vessel, which was then sealed and pressurized with the fluid to the predetermined pressure and a temperature approximately 20° C. below the desired point. The material was contacted with the fluid for approximately 10–15 minutes, after which time the stirrer was started (approximately 2000 rpm). The temperature rose as a result of viscous heating, and eventually reached the predetermined set point. After stirring for approximately 30 minutes, the ball valve was opened and the material in the high-pressure vessle flushed into the collector vessel (which was maintained at room temperature and 300 psi via a back pressure regulator) using additional fluid from the cylinder via the compressor. The ball valve was opened and closed several times to move more material from high-pressure vessle to the collector vessel, with the compressor used each time to maintain pressure in the high pressure vessel.

Tests were done using fluoroform and the two formulations at several conditions (80, 60, and 40C, 2500 psi in a total of 6 runs). All conditions produced powder in both the high-pressure vessel and the collector vessel. The powders recovered from both the high-pressure vessel and the collector vessel were sprayed onto heated metal test panels. Coatings could be formed using powder produced at all conditions discussed above.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A method for producing a powder comprising the steps of:
   a. charging a vessel with a mixture of at least two solid components, at least one of the solid components comprising a polymeric resin;
   b. charging the vessel with a fluid in which the polymeric resin is not substantially soluble, which swells the polymeric resin and which lowers the glass transition temperature of the polymeric resin, the fluid selected such that the density of the fluid can be adjusted upon adjustment of temperature and pressure in the vessel to enable creation of a suspension of the mixture within the vessel upon agitation of the contents of the vessel;
   c. maintaining the temperature of the mixture to a temperature above the glass transition temperature of the polymeric resin in the fluid;
   d. adjusting the pressure of the fluid such that the density of the fluid enables creation of the suspension of the mixture within the vessel upon agitation of the contents of the vessel;
   e. agitating the contents of the vessel; and
   f. reducing the temperature to a temperature below the glass transition temperature of the polymeric resin component in the fluid.

2. The method of claim 1 wherein no component of the mixture is substantially soluble in the fluid.

3. The method of claim 2 further comprising the step of removing the fluid.

4. The method of claim 2 wherein the density of the fluid is adjusted to be within approximately 50% of the average density of the mixture of components.

5. The method of claim 4 wherein the density of the fluid is adjusted to be within approximately 30% of the average density of the mixture of components.

6. The method of claim 5 wherein the density of the fluid is adjusted to be within approximately 15% of the average density of the mixture of components.

7. The method of claim 6 wherein the density of the fluid is adjusted to be within approximately 5% of the average density of the mixture of components.

8. The method of claim 2 wherein fluid comprises a fluorinated compound.

9. The method of claim 8 wherein the fluid comprises $SF_6$.

10. The method of claim 2 wherein the temperature within the vessel is adjusted to be in the vicinity of the critical temperature of the fluid.

11. The method of claim 10 wherein the fluid has a critical temperature less than approximately 100° C.

12. The method of claim 11 wherein the fluid has a critical temperature less than approximately 80° C.

13. The method of claim 2 wherein a surfactant is added to the vessel to facilitate creation of the suspension of the mixture within the vessel.

14. The method of claim 2 wherein the solubility of the polymeric resin in the fluid is no more than approximately 2 wt %.

15. The method of claim 14 wherein the solubility of the polymeric resin in the fluid is no more than approximately 0.1 wt %.

16. The method of claim 2 wherein the fluid has a boiling point less than approximately 25° C.

17. The method of claim 16 wherein the fluid has a boiling point less than approximately 0° C.

18. The method of claim 2 wherein step f. comprises the step of flashing the contents of the vessel through a valve.

19. A method for producing a powder comprising the steps of:
   a. charging a vessel with a mixture of at least two solid components, at least one of the solid components comprising a polymeric resin;
   b. charging the vessel with a fluid in which the polymeric resin is not substantially soluble, which swells the polymeric resin and which lowers the glass transition temperature of the polymeric resin, the fluid selected such that the density of the fluid can be adjusted upon adjustment of temperature and pressure in the vessel to be within approximately 50% of the average density of the mixture of components;
   c. maintaining the temperature of the mixture to a temperature above the glass transition temperature of the polymeric resin in the fluid;
   d. adjusting the pressure of the fluid such that the density of the fluid is within approximately 50% of the average density of the mixture of components;
   e. agitating the contents of the vessel; and
   f. reducing the temperature to a temperature below the glass transition temperature of the polymeric resin component in the fluid.

20. The method of claim 19 wherein no component of the mixture is substantially soluble in the fluid.

21. The method of claim 20 wherein the density of the fluid is adjusted to be within approximately 30% of the average density of the mixture of components.

22. The method of claim 20 wherein the density of the fluid is adjusted to be within approximately 15% of the average density of the mixture of components.

23. The method of claim 20 wherein the density of the fluid is adjusted to be within approximately 5% of the average density of the mixture of components.

24. The method of claim 20 wherein fluid comprises a fluorinated compound.

25. The method of claim 24 wherein the fluid comprises $SF_6$.

26. The method of claim 20 wherein the temperature within the vessel is adjusted to be in the vicinity of the critical temperature of the fluid.

27. The method of claim 26 wherein the fluid has a critical temperature less than approximately 100° C.

28. The method of claim 27 wherein the fluid has a critical temperature less than approximately 80° C.

29. The method of claim 20 wherein a surfactant is added to the vessel to facilitate creation of a generally uniform distribution of the mixture within the vessel.

30. The method of claim 20 wherein the solubility of the polymeric resin in the fluid is no more than approximately 2 wt %.

31. The method of claim 30 wherein the solubility of the polymeric resin in the fluid is no more than approximately 0.1 wt %.

32. The method of claim 20 wherein the fluid has a boiling point less than approximately 25° C.

33. The method of claim 32 wherein the fluid has a boiling point less than approximately 0° C.

34. The method of claim 20 wherein step f. comprises the step of flashing the contents of the vessel through a valve.

35. The method of claim 1 wherein the fluid comprises at least one of $SF_6$, $CF_3H$, $C_2F_6$, $C_2F_5H$, $C_2F_4H_2$ or xenon.

36. The method of claim 19 wherein the fluid comprises at least one of $SF_6$, $CF_3H$, $C_2F_6$, $C_2F_5H$, $C_2F_4H_2$ or xenon.

* * * * *